(12) United States Patent
Li et al.

(10) Patent No.: US 12,236,716 B2
(45) Date of Patent: Feb. 25, 2025

(54) FACE ANTI-SPOOFING RECOGNITION METHOD AND APPARATUS, DEVICE, AND STORAGE MEDIUM

(71) Applicant: Tencent Technology (Shenzhen) Company Limited, Shenzhen (CN)

(72) Inventors: Dan Li, Shenzhen (CN); Zhiqiang Dong, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 487 days.

(21) Appl. No.: 17/746,547

(22) Filed: May 17, 2022

(65) Prior Publication Data

US 2022/0277596 A1 Sep. 1, 2022

Related U.S. Application Data

(63) Continuation of application No. PCT/CN2021/096652, filed on May 28, 2021.

(30) Foreign Application Priority Data

Jun. 22, 2020 (CN) .......................... 202010573539.1

(51) Int. Cl.
*G06V 40/40* (2022.01)
*G06T 7/246* (2017.01)
(Continued)

(52) U.S. Cl.
CPC ............. *G06V 40/40* (2022.01); *G06T 7/248* (2017.01); *G06T 7/64* (2017.01); *G06T 7/74* (2017.01);
(Continued)

(58) Field of Classification Search
None
See application file for complete search history.

(56) References Cited

U.S. PATENT DOCUMENTS 10,311,289 B2 * 6/2019 Sun ..................... G06V 40/171
2010/0158319 A1 6/2010 Jung et al.
(Continued)

FOREIGN PATENT DOCUMENTS

CN 106446831 A 2/2017
CN 106491129 A 3/2017
(Continued)

OTHER PUBLICATIONS

Eyeblink-based Anti-Spoofing in Face Recognition from a Generic Webcamera (Year: 2007).*
(Continued)

*Primary Examiner* — Gregory A Morse
*Assistant Examiner* — Renae A Bitor
(74) *Attorney, Agent, or Firm* — Crowell & Moring LLP

(57) ABSTRACT

This application discloses a face anti-spoofing recognition method and apparatus, a device, and a storage medium, and relates to the field of artificial intelligence (AI) technologies. The method is performed by a computer device, including: acquiring face video data including a to-be-detected face; detecting eye contours of the to-be-detected face from image frames of the face video data, and generating an eye contour sequence; performing eye movement probability prediction based on the eye contour sequence, and generating an eye movement state sequence; acquiring a first dataset and a second dataset in the eye movement state sequence; determining a probability of existence of an abnormal blink behavior of the to-be-detected face according to the first dataset and the second dataset; and determining that the
(Continued)

to-be-detected face is a real face in a case that the probability is less than a predetermined threshold.

20 Claims, 10 Drawing Sheets

(51) Int. Cl.
  *G06T 7/64* (2017.01)
  *G06T 7/73* (2017.01)
  *G06V 20/40* (2022.01)
  *G06V 40/16* (2022.01)
  *G06V 40/18* (2022.01)

(52) U.S. Cl.
  CPC ............ *G06V 20/46* (2022.01); *G06V 40/161* (2022.01); *G06V 40/193* (2022.01); *G06T 2207/10016* (2013.01); *G06T 2207/20076* (2013.01); *G06T 2207/20132* (2013.01); *G06T 2207/30201* (2013.01)

(56) References Cited

U.S. PATENT DOCUMENTS

2011/0188712 A1* 8/2011 Yoo ........................ G06V 40/40
  382/118
2018/0349682 A1 12/2018 Wong et al.

FOREIGN PATENT DOCUMENTS

| CN | 109325472 A | 2/2019 |
| CN | 109376608 A | 2/2019 |
| CN | 110221699 A | 9/2019 |
| CN | 111539389 A | 8/2020 |

OTHER PUBLICATIONS

In Ictu Oculi: Exposing AI Generated Fake Face Videos by Detecting Eye Blinking (Year: 2018).*
Using cascade CNN-LSTM-FCNs to identify AI-altered video based on eye state sequence (Year: 2022).*
International Search Report and Written Opinion issued in International Patent Application No. PCT/CN2021/096652 dated Sep. 1, 2021, w/English translation, 17 pages.
Office Action issued in Chinese Patent Application No. 2020105735391 dated Aug. 17, 2020 w/English translation, 23 pages.
100% Popular Science, "Artificial intelligence is also used to counter fake videos by judging whether blinking is normal!" w/English translation, Jul. 19, 2018.
Jung et al. "Deepvision: Deepfakes Detection Using Human Eye Blinking Pattern," IEEE Access 8, Apr. 20, 2020, 11 pages.
Li et al. "In Ictu Oculi: Exposing AI Created Fake Videos by Detecting Eye Blinking," 2018 IEEE International workshop on information forensics and security (WIFS), Dec. 13, 2018, 7 pages.

* cited by examiner

FACE ANTI-SPOOFING RECOGNITION METHOD AND APPARATUS, DEVICE, AND STORAGE MEDIUM

RELATED APPLICATION

This application is a continuation of International Patent Application No. PCT/CN2021/096652, filed May 28, 2021, which claims priority to Chinese Patent Application No. 202010573539.1, entitled "FACE ANTI-SPOOFING RECOGNITION METHOD AND APPARATUS, DEVICE, AND STORAGE MEDIUM" and filed with the National Intellectual Property Administration, PRC on Jun. 22, 2020, which is incorporated herein by reference in its entirety. The contents of International Patent Application No. PCT/CN2021/096652 and Chinese Patent Application No. 202010573539.1 are each incorporated by reference in their entirety.

FIELD OF THE TECHNOLOGY

Embodiments of this application relate to the field of artificial intelligence (AI) technologies, and in particular, to a face anti-spoofing recognition method and apparatus, a device, and a storage medium.

BACKGROUND OF THE DISCLOSURE

With the research and progress of the AI technology, the AI technology have been applied in a plurality of fields.

Face recognition is a biometric recognition technology in which identity recognition is performed based on human face feature information, and is an important part of the AI technology. During actual application of the face recognition technology, lawbreakers may crack a conventional face recognition technology by making fake faces, for example, making fake faces by making 2D face masks, or they may use deep learning models, for example, generative adversarial networks (GANs), to "change faces" for static images to generate realistic images or videos to make fake faces.

In the conventional face recognition technology, the degree of recognition for the foregoing fake faces is relatively low, and the security is relatively low.

SUMMARY

Embodiments of this application provide a face anti-spoofing recognition method and apparatus, a device, and a storage medium, which can improve the accuracy in recognition of highly realistic fake face videos, thereby improving the security of face recognition.

According to an aspect, an embodiment of this application provides a face anti-spoofing recognition method, performed by a computer device, the method including:

acquiring face video data including a to-be-detected face, the face video data being video data including the to-be-detected face;

detecting eye contours of the to-be-detected face from image frames of the face video data, and generating an eye contour sequence;

performing eye movement probability prediction based on the eye contour sequence, and generating an eye movement state sequence, the eye movement state sequence being used for representing a movement condition of the eyes of the to-be-detected face, and the eye movement state sequence including a plurality of eye movement probabilities distributed in time domain;

acquiring a first dataset and a second dataset in the eye movement state sequence, the first dataset including first N eye movement probabilities obtained after arrangement of the eye movement probabilities in the eye movement state sequence in descending order, and the second dataset including M consecutive eye movement probabilities including a maximum value in the eye movement state sequence, both N and M being positive integers;

determining a probability of existence of an abnormal blink behavior of the to-be-detected face according to the first dataset and the second dataset; and determining that the to-be-detected face is a real face in response to the probability being less than a predetermined threshold.

According to another aspect, an embodiment of this application provides a face anti-spoofing recognition apparatus, including:

a video acquisition module, configured to acquire face video data including a to-be-detected face, the face video data being video data including the to-be-detected face;

a contour sequence generation module, configured to detect eye contours of the to-be-detected face from image frames of the face video data, and generate an eye contour sequence;

an eye movement sequence generation module, configured to perform eye movement probability prediction based on the eye contour sequence, and generate an eye movement state sequence, the eye movement state sequence being used for representing a movement condition of the eyes of the to-be-detected face, and the eye movement state sequence including a plurality of eye movement probabilities distributed in time domain;

a data acquisition module, configured to acquire a first dataset and a second dataset in the eye movement state sequence, the first dataset including first N eye movement probabilities obtained after arrangement of the eye movement probabilities in the eye movement state sequence in descending order, and the second dataset including M consecutive eye movement probabilities including a maximum value in the eye movement state sequence, both N and M being positive integers;

a probability determining module, configured to determine a probability of existence of an abnormal blink behavior of the to-be-detected face according to the first dataset and the second dataset; and a face determining module, configured to determine that the to-be-detected face is a real face in response to the probability being less than a predetermined threshold.

According to another aspect, an embodiment of this application provides a computer device, including a processor and a memory, the memory storing at least one instruction, at least one program, a code set, or an instruction set, the at least one instruction, the at least one program, the code set, or the instruction set being loaded and executed by the processor to implement the foregoing face anti-spoofing recognition method.

According to another aspect, an embodiment of this application provides a computer-readable storage medium, storing at least one instruction, at least one program, a code set, or an instruction set, the at least one instruction, the at least one program, the code set, or the instruction set being loaded and executed by a processor to implement the foregoing face anti-spoofing recognition method.

According to still yet another aspect, an embodiment of this application provides a computer program product, the computer program product, when run on a computer device, causing the computer device to perform the foregoing face anti-spoofing recognition method.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

To make objectives, technical solutions, and advantages of this application clearer, the following further describes implementations of this application in detail with reference to the accompanying drawings.

Figure 1:
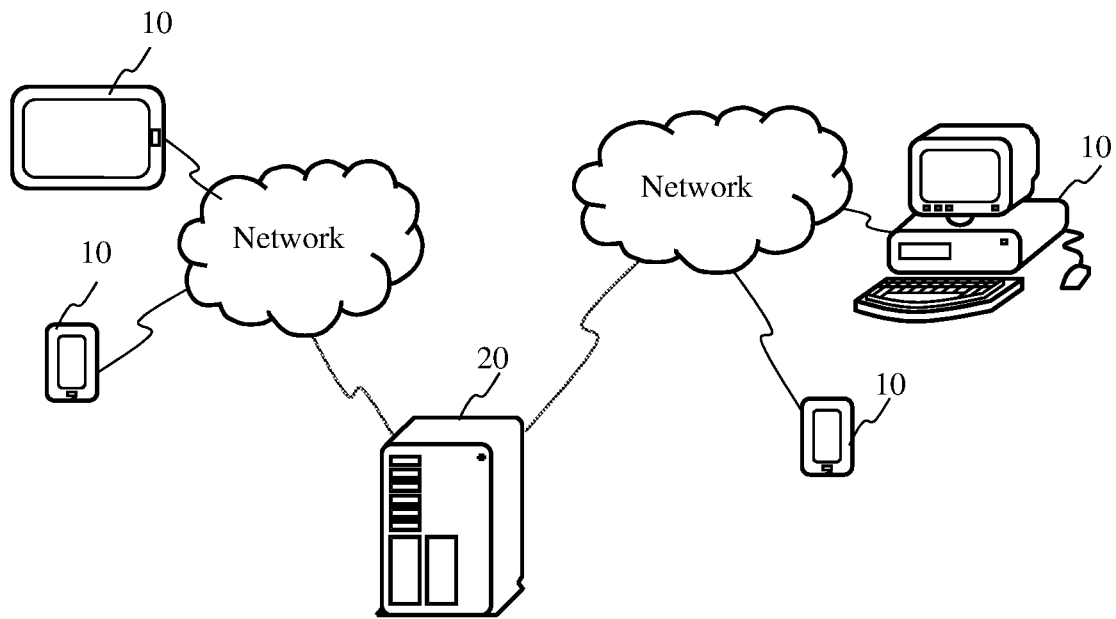
FIG. 1 is a schematic diagram of an implementation environment according to an embodiment of this application.

FIG. 1 is a schematic diagram of an implementation environment of a solution according to an embodiment of this application. The implementation environment of the solution may be implemented as a face anti-spoofing recognition system. The implementation environment of the solution may include a terminal 10 and a server 20.

The terminal 10 may be an electronic device such as a mobile phone, a tablet computer, a multimedia player, a wearable device, or a personal computer (PC), a face payment terminal, a face check-in terminal, or a smart camera. The terminal 10 may be configured with or connected to a camera, and acquire face video data by using the camera. A client of an application may be installed and run on the terminal 10. The application may have a face recognition function. In the embodiments of this application, the type of the application is not limited. For example, the application may be a social application, a payment application, a monitoring application, an instant messaging application, a video application, a news information application, a music application, or a shopping application.

The server 20 may be an independent physical server, or may be a server cluster including a plurality of physical servers or a distributed system, or may be a cloud server providing a cloud computing service. The server 20 may be a backend server of the application, configured to provide a backend service for the application.

The terminal 10 may communicate with the server 20 through a network, which is not limited in this application.

In the face anti-spoofing recognition method provided in the embodiments of this application, an execution entity of the steps may be the server 20 or the terminal 10 (for example, a client of an application run on the terminal 10), or the method may be performed through interaction and cooperation of the terminal 10 and the server 20. For ease of description, in the following method embodiments, the description is provided by merely using a computer device as the execution entity of the steps, but this does not constitute a limitation.

The technical solution of this application relates to the field of the AI technology and the field of the cloud technology, which is described below:

Artificial intelligence (AI) is a theory, method, technology, and application system in which a digital computer or a machine controlled by a digital computer is used to simulate, extend, and expand human intelligence, sense an environment, acquire knowledge, and use the knowledge to obtain an optimal result. In other words, AI is a comprehensive technology of computer sciences, attempts to understand essence of intelligence, and produces a new intelligent machine that can react in a manner similar to human intelligence. AI is to study design principles and implementation methods of various intelligent machines, to enable the machines to have functions of perception, reasoning, and decision-making.

The AI technology is a comprehensive discipline, covering a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. An AI software technology mainly includes fields such as a computer vision (CV) technology, a speech processing technology, a natural language processing technology, and machine learning/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding (ISU), image retrieval, optical character recognition (OCR), video processing, video semantic understanding, video content/behavior recognition, 3D object reconstruction, a 3D technology, virtual reality, augmented reality, synchronous positioning, and map construction, and further include biological feature recognition technologies such as common face recognition and fingerprint recognition.

Machine learning (ML) is a multi-field interdisciplinary subject involving the probability theory, statistics, the approximation theory, convex analysis, the algorithm complexity theory, and the like. ML specializes in studying how a computer simulates or implements a human learning behavior to obtain new knowledge or skills, and reorganize an existing knowledge structure, so as to keep improving its performance. ML, as the core of AI, is a basic way to make the computer intelligent, and is applicable to various fields of AI. ML and deep learning generally include technologies such as an artificial neural network, a belief network, reinforcement learning, transfer learning, inductive learning, and learning from demonstrations.

The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

Cloud computing is a computing mode, in which computing tasks are distributed on a resource pool formed by a large quantity of computers, so that various application systems can acquire computing power, storage space, and information services according to requirements. A network that provides resources is referred to as a "cloud". For a user, resources in a "cloud" seem to be infinitely expandable, and can be obtained readily, used on demand, expanded readily, and paid for according to usage.

As a basic capability provider of cloud computing, a cloud computing resource pool (which is referred to as a cloud platform for short, and is generally referred to as an Infrastructure as a Service (IaaS)) platform is built, and a plurality of types of virtual resources are deployed in the resource pool for external customers to choose for use. The cloud computing resource pool mainly includes: a computing device (which is a virtualized machine, including an operating system), a storage device, and a network device.

According to the division of logical functions, a Platform as a Service (PaaS) layer may be deployed on the IaaS layer, and a Software as a Service (SaaS) layer is then deployed on the PaaS layer, or SaaS may be directly deployed on IaaS. PaaS is a platform on which software runs, such as a database and a web container. SaaS is a variety of service software, such as a web portal and an SMS group sender. Generally, SaaS and PaaS are upper layers relative to IaaS.

An AI cloud service is also generally referred to as AI as a Service (AIaaS). This is the current mainstream service manner of AI platforms. Specifically, the AIaaS platform splits several types of common AI services and provide independent or packaged services in the cloud. This service mode is similar to opening an AI-themed mall: all developers can access and use one or more AI services provided by the platform through API interfaces, and some senior developers may also use AI frameworks and AI infrastructures provided by the platform to deploy and operate dedicated cloud AI services.

With the research and progress of the AI technology and the cloud technology, the AI technology and the cloud technology have been studied and applied in a plurality of fields. It is believed that with the development of technologies, the AI technology and the cloud technology will be applied in more fields and play an increasingly important role.

The embodiments of this application provide a technical solution for dealing with face black production, which is used for adversarial detection of face black production. The face black production means that lawbreakers acquire citizens' personal information and face information by using the Internet as a medium and the network technology as the main means, so as to bypass security policies of the government and enterprise services and Internet companies, and pass face recognition authentication by using the deep learning technology or physical masks to achieve the purpose of profit seeking, and a black industry chain for deceiving the face anti-spoofing recognition technology is formed. By parsing face video data to obtain eye movement probability sets that reflect an eye movement state of a to-be-detected face, that is, an eye movement state sequence, analyzing whether an abnormal blink behavior exists in the face video data according to two particular eye movement probability sets thereof, and then determining whether the to-be-detected face is a real face, the accuracy in recognition of highly realistic fake face videos is improved, thereby improving the security of face recognition, and effectively preventing lawbreakers from forging identities of others by using fake face videos.

The technical solutions of this application are described below by using several embodiments.

Figure 2:
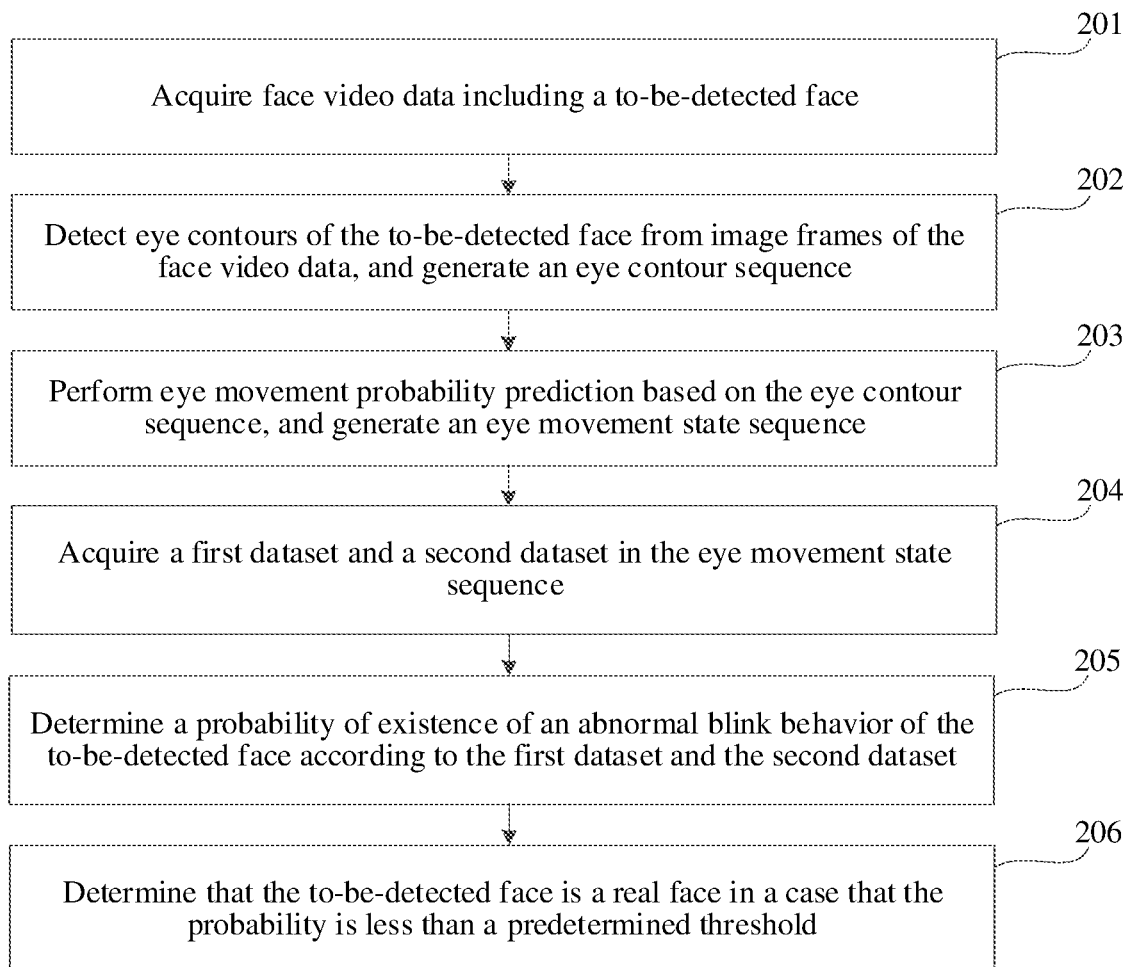
FIG. 2 is a flowchart of a face anti-spoofing recognition method according to an embodiment of this application.

FIG. 2 is a flowchart of a face anti-spoofing recognition method according to an embodiment of this application. The method may include the following steps (201 to 206).

Step 201: Acquire face video data including a to-be-detected face.

The face video data is video data including the to-be-detected face. A format of the face video data includes, but not limited to, any one of the following: the audio video interactive (AVI) format, the Windows Media Video (WMV) format, the advanced systems format (ASF), the moving picture experts group (MPEG) format, the multimedia container (MKV) format, the RealMedia Variable Bitrate (RMVB) format, and the FlashVideo (FLU) format. The face video data may be acquired by a computer device itself, or may be received from other devices, which is not limited in this embodiment of this application.

The to-be-detected face is a face in video images and authenticity of the face needs to be determined through detection. The to-be-detected face may be a real face or a fake face.

The fake face is a fake face forged by imitating a real face by using some technical means, which is used to deceive the face anti-spoofing recognition technology, so as to pass the face anti-spoofing recognition authentication. With the emergence of a new generation of deep neural networks, editing workload required to forge fake face video data is greatly reduced. By using the deep neural networks, lawbreakers can synthesize highly realistic fake face videos from a large amount of training data with minimal manual editing. For example, a software tool called DeepFake generates realistic fake faces based on a GAN model trained with tens of thousands of images, and seamlessly stitches these fake faces into original videos to generate highly realistic fake face videos, which causes identities of subjects having real faces in the videos to be forged. However, although such fake face video data can capture facial features of real faces in the synthesis process, physiological signals generated by the real faces in physiological activities are often ignored. The physiological activities include spontaneous physiological activities and non-spontaneous physiological activities, for example, physiological activities of the eyes such as blinks and eyeball movements. The physiological signals are generated during physiological activities. The fake face is a 2D face mask, and the 2D face mask is a fake face forged according to a real face. For example, a lawbreaker makes a 2D face mask according to a real face image, and deceives face recognition technology by wearing the 2D face mask or in other manners to pass face recognition authentication.

The real face is a face recorded by a real user in a video, and the subject of the to-be-detected face is consistent with the user who is actually detected. The real face in the face video data often has physiological activities such as blinks. Blinks refer to rapid closing and opening of the eyes. There are mainly three types of blinks, including spontaneous blinks, reflex blinks, and voluntary blinks. Spontaneous blinks refer to blinks without external stimuli and internal forces, which occur without conscious control. Spontaneous blinks have an important biological function: capable of moisturizing the corneas and conjunctival surfaces with tears and removing irritants. According to statistics, a normal person blinks a dozen of times per minute on average, and usually blinks once every 2 to 6 seconds. Each blink takes 0.2 to 0.4 seconds. During a conversation, the frequency of spontaneous blinks may increase. During reading, the frequency of spontaneous blinks may decrease.

Step 202: Detect eye contours of the to-be-detected face from image frames of the face video data, and generate an eye contour sequence.

An image frame is the smallest unit of a video, and the image frame reflects image data displayed by the face video data at a time point corresponding to the current image frame. The eye contour is a closed contour determined according to the eyelids of the to-be-detected face. The eyelids are the skin that can be opened and closed around the eyes, and are located in front of the eyeballs. The eyelids include upper eyelids and lower eyelids. The eye contour sequence is a set of eye contour images in the to-be-detected face. The eye contour image is an image generated by extracting a corresponding rectangular region around the eye contour from the to-be-detected face. The eye contour sequence is a set of eye contour images cropped from all eye pictures. The eye contours in the eye contour sequence are arranged in the time order of the image frames to which the eye contours belong.

Figure 3:
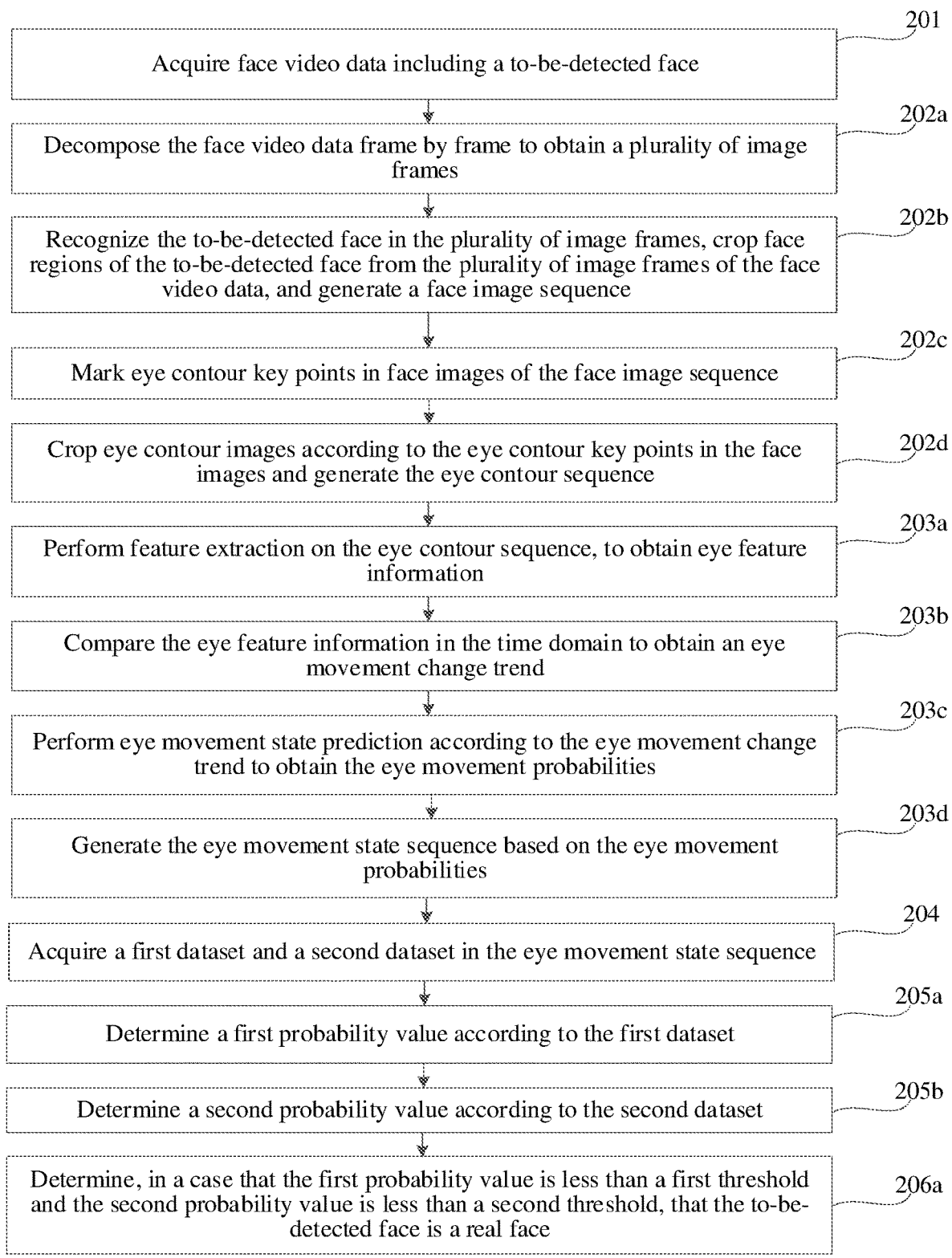
FIG. 3 is a flowchart of a face anti-spoofing recognition method according to another embodiment of this application.

In an exemplary embodiment, FIG. 3 is a flowchart of a face anti-spoofing recognition method according to another embodiment. Step 202 may be replaced and implemented by the following steps 202a to 202d.

Step 202a: Decompose the face video data frame by frame to obtain a plurality of image frames.

Figure 4:
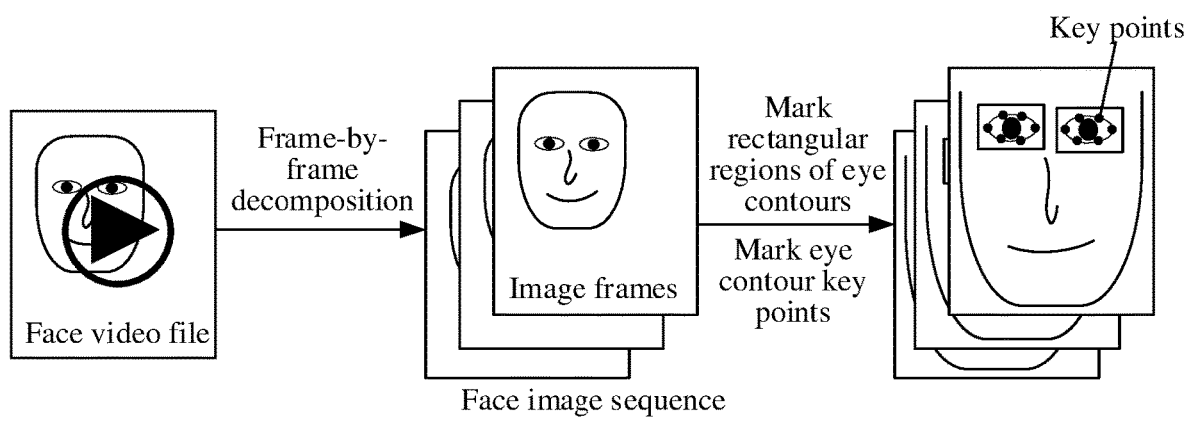
FIG. 4 is a schematic exemplary diagram of pre-processing face video data.

FIG. 4 is a schematic exemplary diagram of a preprocessing process for face video data. Image frames are generated by decomposing the face video data frame by frame. The quantity of image frames generated after the frame-by-frame decomposition is equal to the total quantity of frames of the face video data.

Step 202b: Recognize the to-be-detected face in the plurality of image frames, crop face regions of the to-be-detected face from the plurality of image frames of the face video data, and generate a face image sequence.

As shown in FIG. 4, a to-be-detected face in an image frame is recognized. Whether the image frame includes a face is recognized, and if the image frame includes a face, a face region of the to-be-detected face is cropped from the image frame of the face video data, to generate a face image corresponding to the image frame. A face image sequence is generated based on the face images. The face image sequence is a set of face images cropped from all image frames in which a face exists. The face images in the face image sequence are arranged in the time order of the image frames to which the face images belong.

Step 202c: Mark eye contour key points in face images of the face image sequence.

As shown in FIG. 4, the eye contour key points are key points in the eye contour that reflect a shape of the eye contour. Whether the eyes in the to-be-detected face are in an opened state or a closed state can be determined according to the eye contour key points. A degree of opening or a degree of closing of the eyes in the to-be-detected face can be determined according to the eye contour key points. The marking eye contour key points in face images of the face image sequence includes: marking corners of the eyes at both ends as eye contour key points, and respectively marking two particular positions in the upper eyelid or the lower eyelid as eye contour key points.

Step 202d: Crop eye contour images according to the eye contour key points in the face images and generate the eye contour sequence.

As shown in FIG. 4, a corresponding rectangular region around the eye contour is cropped according to the eye contour key points in the face image, and an eye contour image is generated. The rectangular region is the smallest rectangular region including the contour of the face. The rectangular region is the smallest rectangular region including the eye contour key points.

An eye contour sequence is generated based on the eye contour images.

Step 203: Perform eye movement probability prediction based on the eye contour sequence, and generate an eye movement state sequence.

The eye movement probability prediction is a behavior of evaluating and calculating an eye movement probability of existence of a blink behavior of the to-be-detected face at a specific time point based on the eye contour sequence. The eye movement probability reflects a probability of existence of a blink behavior at a corresponding time point, and serves as a data basis for subsequent step analysis. The eye movement probability may be a probability value, for example, a value thereof may be obtained from an interval [0, 1]. Each image frame including a face image in the face video data corresponds to an eye movement probability, which reflects a probability of existence of a blink behavior at the time point. The eye movement probability is determined according to a degree of change of the eye contour in the foregoing image frame, and the eye movement probability is in a positive correlation with the degree of change of the eye contour. For example, the degree of change of the eye contour in a squinting action is lower than the degree of change of the eye contour in a blink action, so that the eye movement probability of the squinting action is lower than the eye movement probability of the blink action.

The eye movement state sequence is used for representing a movement condition of the eyes of the to-be-detected face, for example, a blink movement condition of the eyes. The eye movement state sequence includes a plurality of eye movement probabilities distributed in the time domain. The eye movement state sequence is a set of the eye movement probabilities. The eye movement probabilities in the eye movement state sequence are arranged according to the time order of the image frames to which eye contour images corresponding to the eye movement probabilities belong.

Step 203 may be implemented by an eye movement state acquisition model. The eye movement state acquisition model is a machine learning model configured to determine an eye movement probability according to face video data, and then acquire an eye movement state.

The eye movement state acquisition model is a long-term recurrent convolutional network (LRCN) model, and the LRCN model can effectively acquire an eye movement state of the to-be-detected face. The LRCN model is a model formed through combination of a convolutional neural network (CNN) and a long short-term memory (LSTM) network.

Figure 5:
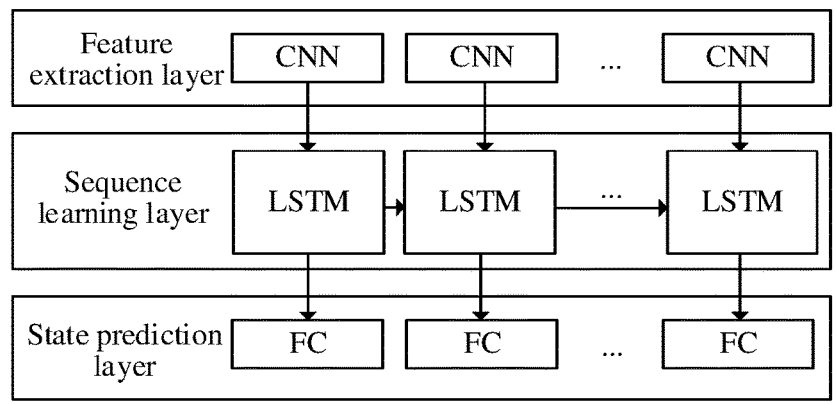
FIG. 5 is a schematic exemplary diagram of a structure of an LRCN model.

FIG. 5 is a schematic exemplary diagram of a structure of an LRCN model. The LRCN model includes a feature extraction layer, a sequence learning layer and a state prediction layer. The feature extraction layer converts inputted eye contour images into recognizable features. The feature extraction layer is implemented with a CNN based on a VGG16 framework, but has no fc7 layer and no fc8 layer. VGG16 includes 5 blocks of consecutive convolutional layers conv1 to conv5, and each block is followed by a max-pooling operation. Subsequently, three fully-connected layers fc6 to fc8 are added to the last block. An output of the feature extraction layer is inputted into the sequence learning layer. The sequence learning layer is implemented by a recurrent neural network (RNN) having a long short-term memory (LSTM) unit. The use of LSTM-RNN is to increase the storage capacity of the RNN model, thereby avoiding the disappearance of the gradient of the training algorithm during the training stage. The LSTM unit is a memory unit that controls when and how to forget previous hidden states and when and how to update hidden states.

Figure 6:
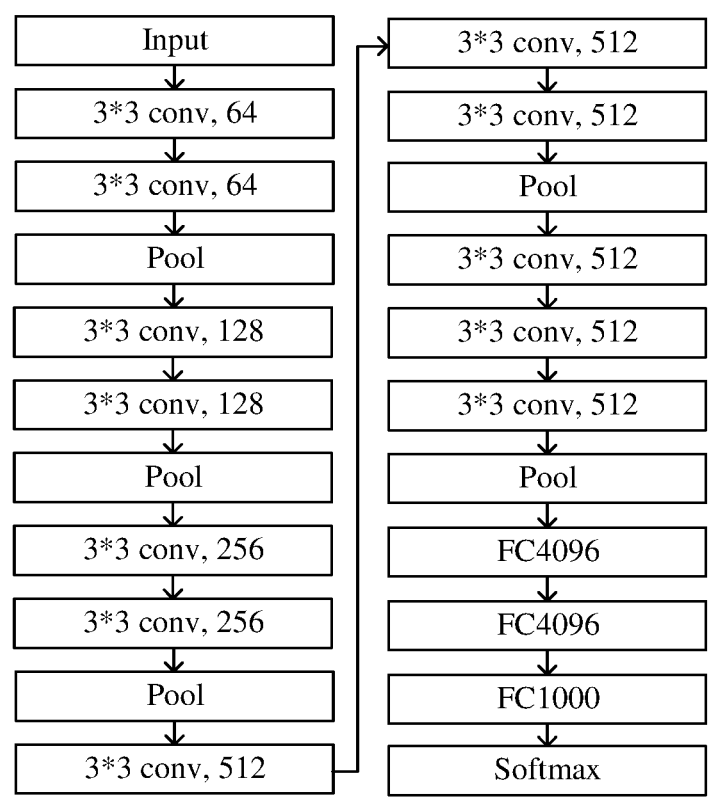
FIG. 6 is a schematic exemplary diagram of a CNN structure based on VGG16.

FIG. 6 is a schematic exemplary diagram of a CNN structure based on VGG16. The CNN is a feedforward neural network including convolutional computation and having a deep structure. The CNN includes an input layer and a hidden layer. The input layer of the CNN can process multidimensional data. Because the gradient descent algorithm is used for learning, and input features of the CNN need to be standardized, which helps to improve the learning efficiency and performance of the CNN. The hidden layer of the CNN includes three common constructions: a convolutional layer, a pooling layer, and a fully-connected layer. In some more modern algorithms, there may be complex constructions such as an Inception module and a residual block. In common constructions, the convolutional layer and the pooling layer are particular to the CNN. The convolution kernel in the convolutional layer includes a weight coefficient, and the pooling layer includes no weight coefficient. The pooling layer may not be considered as an independent layer.

The LSTM is a time recurrent neural network, which is specially designed to solve the long-term dependence problem of general RNNs, and suitable for processing and predicting an important event with a relatively long interval and latency in a time sequence. One LSTM model may include a large quantity of LSTM units, and each LSTM unit includes an input gate, an output gate, a forget gate, and a memory unit.

In an exemplary embodiment, FIG. 3 is a flowchart of a face anti-spoofing recognition method according to another embodiment. Step 203 may be replaced and implemented by the following steps 203a to 203d.

Step 203a: Perform feature extraction on the eye contour sequence, to obtain eye feature information.

The feature extraction may be extracting the eye feature information of the eye contour images in the eye contour sequence. The eye feature information is extracted according to the eye contour key points in the eye contour images. The eye feature information is extracted according to the eye contours in the eye contour images. The eye feature information includes the eyes of the to-be-detected face being in an opened state or a closed state, and a degree of opening or a degree of closing.

Step 203a may be implemented by the feature extraction layer in the LRCN model.

Step 203b: Compare the eye feature information in the time domain to obtain an eye movement change trend.

The comparison in the time domain refers to comparing eye feature information corresponding to different eye contour images in the eye contour sequence, and the image frames to which the different eye contour images belong correspond to different time points in the time domain. In the time domain, the eye feature information is compared in a one-way time order from early to late. For example, an eye contour image before the current eye contour image in the time domain is selected to compare with the current eye contour image. In the time domain, the eye feature information is compared in a two-way time order from early to late and from late to early. For example, an eye contour image before the current eye contour image and an eye contour image after the current eye contour image in the time domain are selected to compare with the current eye contour image.

After comparison of the eye feature information in the time domain, an eye movement change trend of the to-be-detected face in the eye contour sequence is obtained. The eye movement change trend is a trend representing an eye movement change of the to-be-detected face in the eye contour sequence, which reflects a difference between the eye feature information corresponding to different eye contour images in the eye contour sequence. For example, for the eyes in the to-be-detected face that are gradually opened, the eye movement change trend is reflected as an increase of the degree of opening of the eyes in the to-be-detected face.

Step 203b may be implemented by the sequence learning layer in the LRCN model.

Step 203c: Perform eye movement state prediction according to the eye movement change trend to obtain the eye movement probabilities.

The eye movement state prediction refers to predicting the eye movement state in the to-be-detected face based on the eye movement change trend. The generation of a blink behavior may be accompanied by an eye movement change trend in which the eyes are changed from an opened state into a closed state, or changed from a closed state into an opened state. If the eye movement change trend is roughly consistent with the eye movement change trend generated by the blink behavior in a specific period of time, it can be predicted that the to-be-detected face may have a blink behavior during this period of time.

After the eye movement state prediction, the eye movement probability of a blink behavior of the to-be-detected face is calculated. According to a degree of coincidence between the eye movement change trend in a specific period of time and the eye movement change trend generated by the blink behavior, the eye movement probability corresponding to the possible blink behavior of the to-be-detected face in this period of time is calculated.

Step 203d: Generate the eye movement state sequence based on the eye movement probabilities.

The eye movement probabilities are arranged in time order, to generate an eye movement state sequence.

Step 203c and step 203d may be implemented by the state prediction layer in the LRCN model.

Step 204: Acquire a first dataset and a second dataset in the eye movement state sequence.

The first dataset in the eye movement state sequence is acquired. The first dataset includes first N eye movement probabilities obtained after arrangement of the eye movement probabilities in the eye movement state sequence in descending order. The arrangement in descending order means that the eye movement probabilities in the eye movement state sequence are arranged in descending order according to values, N being a positive integer. A value range of N is determined empirically. The first dataset is used as a data basis for detecting whether there is a frequent blink behavior in the face video data.

The second dataset in the eye movement state sequence is acquired. The maximum value $V_j$ in the eye movement state sequence and a position index $I_j$ of the maximum value $V_j$ in the eye movement state sequence are acquired, a length of the eye movement state sequence being L; a value of M is determined according to a frame rate of the face video data, M being less than or equal to a total quantity of frames of the face video data; and in a case that a value of $I_j-M/2$ is greater than 0 and a value of $I_j+M/2$ is less than L−1, M consecutive eye movement probabilities with position indexes from $I_j-M/2$ to $I_j+M/2$ are acquired to obtain the second dataset; or in a case that a value of $I_j-M/2$ is less than 0, M consecutive eye movement probabilities with position indexes from 0 to M−1 are acquired to obtain the second dataset; or in a case that a value of $I_j+M/2$ is greater than L−1, M consecutive eye movement probabilities with position indexes from L−M to L−1 are acquired to obtain the second dataset. That is, the second dataset includes M consecutive eye movement probabilities including the maximum value in the eye movement state sequence, M being a positive integer. The second dataset is used as a data basis for detecting whether there is an excessively fast blink behavior in the face video data. The value of M is changeable. The value of M is obtained from an interval [8, 20].

Both N and M are positive integers less than or equal to the length L of the eye movement state sequence, and the length L of the eye movement state sequence is the quantity of eye movement frequencies included in the eye movement state sequence.

Step 205: Determine a probability of existence of an abnormal blink behavior of the to-be-detected face according to the first dataset and the second dataset.

Data in the first dataset and the second dataset is acquired. The data in the first dataset and the second dataset is processed, and a probability of existence of an abnormal blink behavior of the to-be-detected face is outputted.

The process of processing the first dataset is to mine whether the data in the first dataset has a data feature of having a frequent blink behavior. The frequent blink behavior is an abnormal blink behavior, indicating that the quantity of blinks exceeds the quantity of blinks generated by normal physiological activities, and then it is determined that there is a high possibility that the face video data is fake face video data.

The process of processing the second dataset is to mine whether the data in the second dataset has a data feature of having an excessively fast blink behavior. The excessively fast blink behavior is an abnormal blink behavior, indicating that the blink frequency is excessively high and exceeds a blink frequency generated by normal physiological activities, and then it is determined that there is a high possibility that the face video data is fake face video data.

In an exemplary embodiment, as shown in FIG. 3, step 205 may be replaced and implemented by the following steps 205a and 205b.

Step 205a: Determine a first probability value according to the first dataset.

The first dataset is processed by using a first classification model, to obtain the first probability value. The first probability value is a probability that the to-be-detected face is determined to be a real face according to the first dataset.

The first classification model is a first support vector machine (SVM) classifier, configured to determine a first probability value corresponding to the first dataset according to the inputted first dataset. SVM is a generalized linear classifier that performs binary classification on data in a supervised learning manner, and its decision boundary is the maximum-margin hyperplane that solves learning samples. SVM uses a hinge loss function to calculate an empirical risk, and adds a regularization term to a solution system to optimize the structural risk. It is a classifier with sparsity and robustness. SVM can perform nonlinear classification through the kernel method, which is one of the common kernel learning methods. The first SVM classifier is an SVM classifier obtained through training, and the training samples may be first datasets in all eye movement state sequences corresponding to a face video data sample set.

Figure 7:
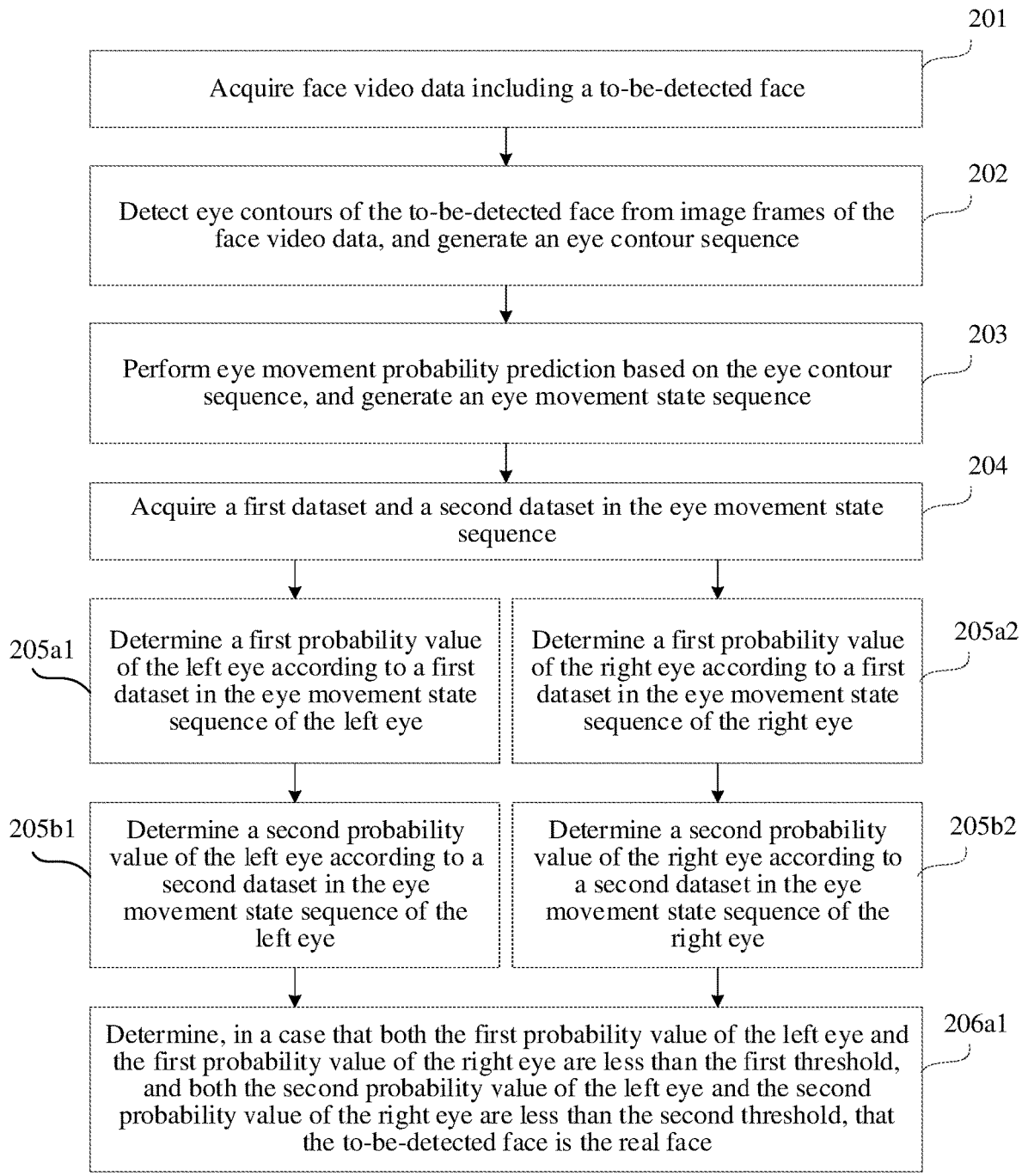
FIG. 7 is a flowchart of a face anti-spoofing recognition method according to another embodiment of this application.

In an exemplary embodiment, as shown in FIG. 7, step 205a may be replaced and implemented by the following steps 205a1 and 205a2.

Step 205a1: Determine a first probability value of the left eye according to a first dataset in the eye movement state sequence of the left eye.

Step 205a2: Determine a first probability value of the right eye according to a first dataset in the eye movement state sequence of the right eye.

Step 205b: Determine a second probability value according to the second dataset.

The second dataset is processed by using a second classification model, to obtain the second probability value. The second probability value is a probability that the to-be-detected face is determined as a real face according to the second dataset.

The second classification model is a second SVM classifier, configured to determine a second probability value corresponding to the second dataset according to the inputted second dataset. The second SVM classifier is an SVM classifier obtained through training, and the training samples are second datasets in all eye movement state sequences corresponding to a face video data sample set. In this embodiment of this application, a description is made by mainly using an example in which the first classification model and the second classification model are SVM classifiers. In some other embodiments, other models having classification functions, such as neural network models, may alternatively be used. This is not limited in this embodiment of this application.

In an exemplary embodiment, as shown in FIG. 7, step 205b may be replaced and implemented by the following steps 205b1 and 205b2.

Step 205b1: Determine a second probability value of the left eye according to a second dataset in the eye movement state sequence of the left eye.

Step 205b2: Determine a second probability value of the right eye according to a second dataset in the eye movement state sequence of the right eye.

Step 206: Determine that the to-be-detected face is a real face in a case that the probability is less than a predetermined threshold.

The fact that the probability is smaller than the predetermined threshold is a basis for determining that there is no excessively fast or frequent blink behavior in the face video data. The probability is a probability that reflects existence of an abnormal blink behavior of the to-be-detected face, and includes a first probability value and a second probability value. In addition, in a case that the probability is greater than the predetermined threshold, it is determined that the to-be-detected face has an abnormal blink behavior, and further, it can be determined that the to-be-detected face is a fake face.

In an exemplary embodiment, referring to FIG. 3, step 206 may be replaced and implemented by using the following steps.

Step 206a: Determine, in response to the first probability value being less than a first threshold and the second probability value is less than a second threshold, that the to-be-detected face is the real face.

The first threshold is determined after the first classification model is trained. By setting the first threshold, the effect of face anti-spoofing recognition can be effectively improved, and the accuracy of anti-spoofing recognition can be improved.

The second threshold is determined after the second classification model is trained. By setting the second threshold, the effect of face anti-spoofing recognition can be effectively improved, and the accuracy of anti-spoofing recognition can be improved.

In addition, when the first probability value is greater than the first threshold or the second probability value is greater than the second threshold, it is determined that the to-be-detected face has an abnormal blink behavior, that is, it is determined that the to-be-detected face is a fake face.

In an exemplary embodiment, referring to FIG. 7, step 206a may be replaced with the following step 206a1.

Step 206a1: Determine, in response to both the first probability value of the left eye and the first probability value of the right eye being less than the first threshold, and both the second probability value of the left eye and the second probability value of the right eye being less than the second threshold, that the to-be-detected face is the real face.

In addition, in response to either of the first probability value of the left eye and the first probability value of the right eye being less than the first threshold, or either of the second probability value of the left eye and the second probability value of the right eye being less than the second threshold, it is determined that the to-be-detected face is not a real face, that is, it is determined that the to-be-detected face is a fake face.

Figure 8:
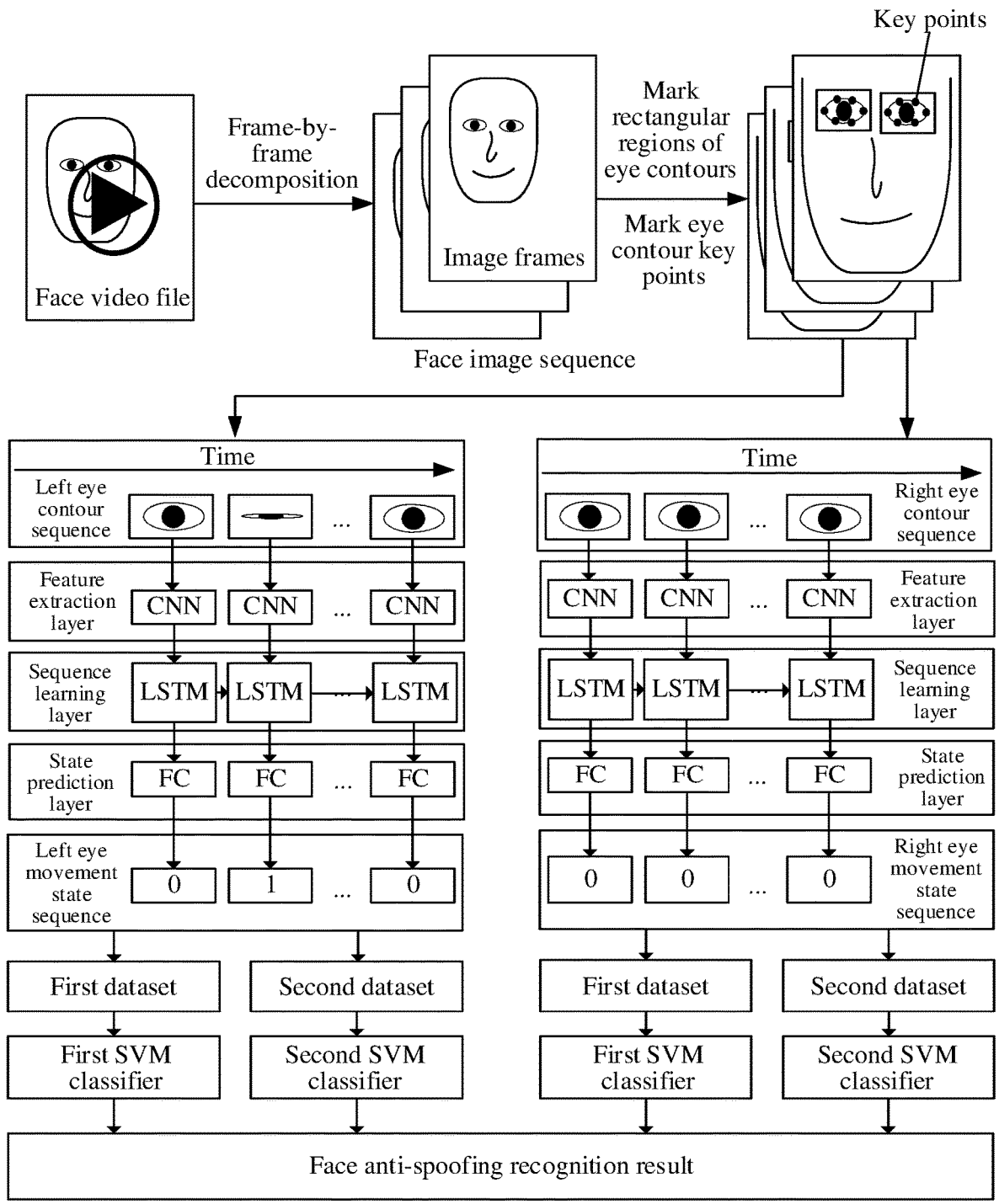
FIG. 8 is a schematic exemplary diagram of a face anti-spoofing recognition processing process.

In an exemplary embodiment, FIG. 8 is a schematic diagram of a face anti-spoofing recognition processing process, which embodies a process of performing anti-spoofing recognition processing on face video data in this embodiment. The face video data is first decomposed into image frames frame by frame, a to-be-detected face in the image frames of the face video data is recognized, face regions are cropped, and a face image sequence is generated; eye contour key points in the face image sequence are marked, corresponding rectangular regions around eye contours are cropped as eye contour images, and an eye contour sequence is generated; the eye contour sequence is inputted into an LRCN model, and the eye contour sequence is sequentially processed by a feature extraction layer, a sequence learning layer, and a state learning layer in the LRCN model, to output an eye movement state sequence; first datasets and second datasets in a left eye movement state sequence and a right eye movement state sequence of the eye movement state sequence are respectively acquired; the first dataset and the second dataset in the left eye/right eye movement state sequence are respectively inputted into a first SVM classifier and a second SVM classifier; and a face anti-spoofing recognition result is determined according to output results of the first SVM classifier and the second SVM classifier.

Based on the above, according to the technical solution provided in this embodiment of this application, by parsing face video data to obtain eye movement probability sets that reflect an eye movement state of a to-be-detected face, that is, an eye movement state sequence, analyzing whether an abnormal blink behavior exists in the face video data according to two particular eye movement probability sets thereof, and then determining whether the to-be-detected face is a real face, the accuracy in recognition of highly realistic fake face videos is improved, thereby improving the security of face recognition, and effectively preventing lawbreakers from forging identities of others by using fake face videos. In addition, the method is not limited by video acquisition conditions, and has good transferability.

In addition, according to the technical solution provided in this embodiment of this application, the foregoing two particular eye movement probability sets are respectively processed by using two classification models, to output a first probability value and a second probability value that respectively reflect a probability of existence of an excessively fast or frequent abnormal blink behavior in the face video data; and whether the to-be-detected face is a real face is determined according to whether the two probability values are respectively less than a first threshold and a second threshold. By determining more than one type of abnormal blink behavior, the security of face recognition is further improved.

In addition, according to the technical solution provided in this embodiment of this application, by recognizing the left eye and the right eye respectively, the negative influence of existence of a normal eye movement state of one eye in the fake face video on the recognition result is eliminated, thereby improving the security of face recognition more comprehensively and meticulously.

Figure 9:
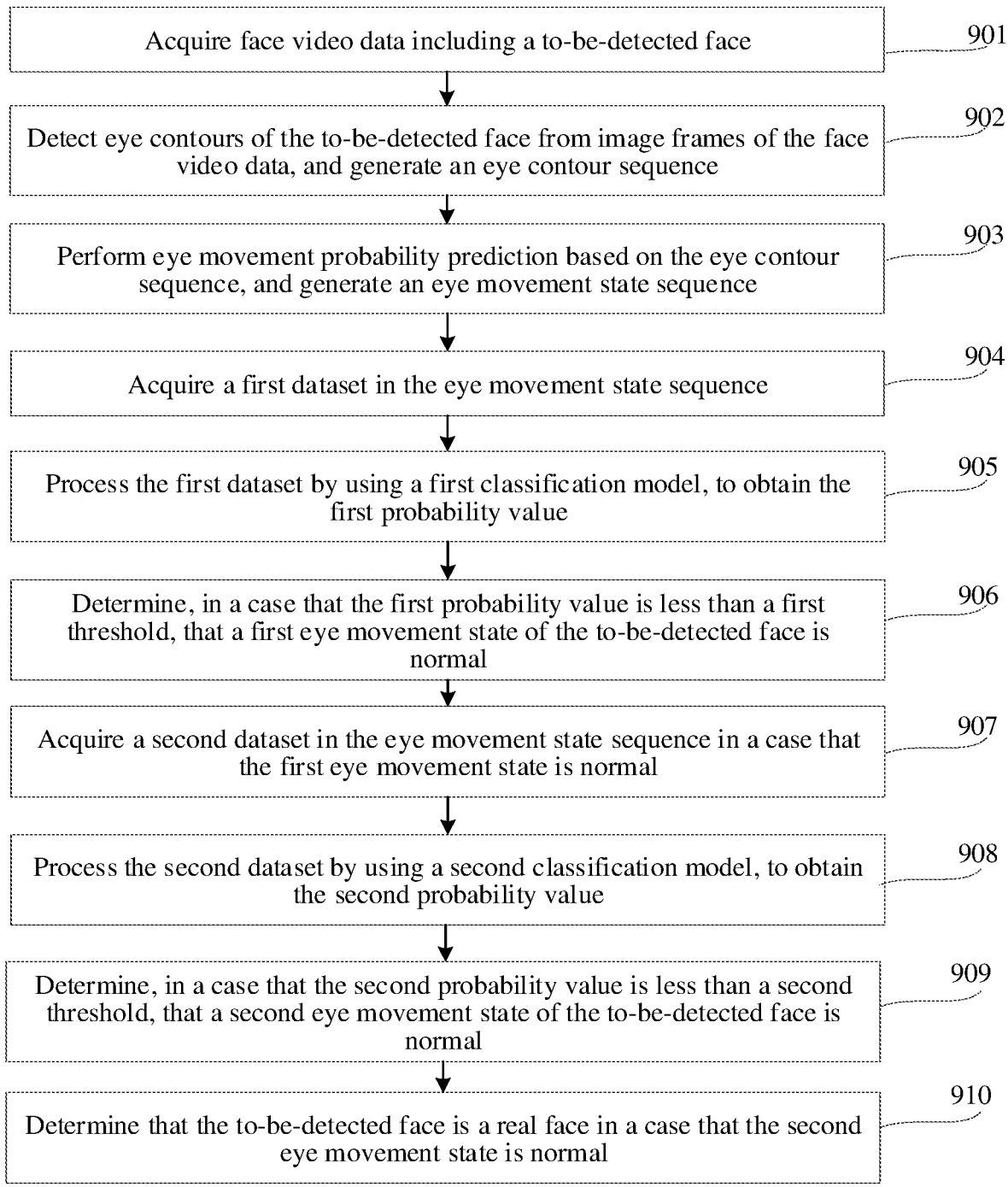
FIG. 9 is a flowchart of a face anti-spoofing recognition method according to another embodiment of this application.

FIG. 9 is a flowchart of a face anti-spoofing recognition method according to another embodiment of this application. The method may include the following steps (901 to 910).

Step 901: Acquire face video data including a to-be-detected face.

Face video data is acquired by creating a synchronous/asynchronous data interface. The synchronous data interface is configured to receive incoming real-time video data, and the asynchronous data interface is configured to receive incoming non-real-time video data. The synchronous/asynchronous data interface can receive incoming video data in an offline state or an online state. The synchronous/asynchronous data interface receives incoming video data from electronic devices such as a server, a terminal, a camera, and a memory. The transferability of the face anti-spoofing recognition method is improved, and application scenarios of the face anti-spoofing recognition method are enriched.

Step 902: Detect eye contours of the to-be-detected face from image frames of the face video data, and generate an eye contour sequence.

The eye contour sequence includes a left eye contour sequence and a right eye contour sequence.

Step 903: Perform eye movement probability prediction based on the eye contour sequence, and generate an eye movement state sequence.

Step 903 is implemented by an eye movement state acquisition model. The eye movement state acquisition model is an LRCN model obtained through training. The LRCN model processes the left eye contour sequence and the right eye contour sequence in the eye contour sequence, and an obtained eye movement state sequence S0 has a length of L. The LRCN model first processes the left eye contour sequence, and then processes the right eye contour sequence. Two LRCN models process the left eye contour sequence and the right eye contour sequence simultaneously. The eye movement state sequence S0 includes a left eye movement state sequence L_S0 corresponding to the left eye contour sequence and a right eye movement state sequence R_S0 corresponding to the right eye contour sequence.

Step 904: Acquire a first dataset in the eye movement state sequence.

The eye movement state sequence S0 is arranged in descending order, first N pieces of data are acquired, to obtain a sequence SN, and sequence value indexes IN are generated. The sequence SN includes a first dataset L_SN in the left eye movement state sequence L_S0 and a first dataset R_SN in the right eye movement state sequence R_S0. The sequence value indexes IN include left eye sequence value indexes L_IN corresponding to L_SN and right eye sequence value indexes R_IN corresponding to R_SN.

Step 905: Process the first dataset by using a first classification model, to obtain the first probability value.

A first probability value of the left eye is determined according to a first dataset in the eye movement state sequence of the left eye; and a first probability value of the right eye is determined according to a first dataset in the eye movement state sequence of the right eye.

The first classification model is a first SVM classifier. L_SN is inputted into the first SVM classifier, and a first probability value P(L_SN) of the left eye corresponding to L_SN is outputted by using the first SVM classifier. R_SN is inputted into the first SVM classifier, and a first probability value P(R_SN) of the right eye corresponding to R_SN is outputted by using the first SVM classifier.

Step 906: Determine, in response to the first probability value being less than a first threshold, that a first eye movement state of the to-be-detected face is normal.

In response to both the first probability value of the left eye and the first probability value of the right eye being less than a first threshold, it is determined that a first eye movement state of the to-be-detected face is normal. In addition, when either of the first probability value of the left eye and the first probability value of the right eye is greater than the first threshold, it is determined that the first eye movement state of the to-be-detected face is abnormal.

If the first probability value P(L_SN) of the left eye is greater than the first threshold, a left eye movement state is abnormal, and it is determined that the to-be-detected face is a fake face; if the first probability value P(R_SN) of the right eye is greater than the first threshold, a right eye movement state is abnormal, and it is determined that the to-be-detected face is a fake face; and if both the first probability value P(L_SN) of the left eye and the first probability value P(R_SN) of the right eye are less than the first threshold, it is determined that the first eye movement state of the to-be-detected face is normal.

Step 907: Acquire a second dataset in the eye movement state sequence in response to the first eye movement state being normal.

M pieces of data in the eye movement state sequence S0 are acquired, to obtain a sequence SM, and sequence value indexes IM are generated. A value of M is greater than 8 and less than 20. The value of M is changeable, and is determined according to a frame rate in the face video data. The sequence SM includes a second dataset L_SM in the left eye movement state sequence L_S0 and a second dataset R_SM in the right eye movement state sequence R_S0. The sequence value indexes IM include left eye sequence value indexes L_IM corresponding to L_SM and right eye sequence value indexes R_IM corresponding to R_SM.

Step 908: Process the second dataset by using a second classification model, to obtain the second probability value.

A second probability value of the left eye is determined according to a second dataset in the eye movement state sequence of the left eye; and a second probability value of the right eye is determined according to a second dataset in the eye movement state sequence of the right eye.

The second classification model is a second SVM classifier. L_SM is inputted into the second SVM classifier, and a second probability value P(L_SM) of the left eye corresponding to L_SM is outputted by using the second SVM classifier. R_SM is inputted into the second SVM classifier, and a second probability value P(R_SM) of the right eye corresponding to R_SM is outputted by using the second SVM classifier.

Step 909: Determine, in response to the second probability value being less than a second threshold, that a second eye movement state of the to-be-detected face is normal.

In response to both the second probability value of the left eye and the second probability value of the right eye being less than the second threshold, it is determined that a second eye movement state of the to-be-detected face is normal. In addition, when either of the second probability value of the left eye and the second probability value of the right eye is greater than the second threshold, it is determined that the second eye movement state of the to-be-detected face is abnormal.

If the second probability value P(L_SM) of the left eye is greater than the second threshold, a left eye movement state is abnormal, and it is determined that the to-be-detected face is a fake face; if the second probability value P(R_SM) of the right eye is greater than the second threshold, a right eye movement state is abnormal, and it is determined that the to-be-detected face is a fake face; and if both the second probability value P(L_SM) of the left eye and the second probability value P(R_SM) of the right eye are less than the second threshold, it is determined that a second eye movement state of the to-be-detected face is normal.

Step 910: Determine that the to-be-detected face is a real face in response to the second eye movement state being normal.

If the second eye movement state of the to-be-detected face is normal, it is determined that the to-be-detected face is a real face. If the second eye movement state of the to-be-detected face is abnormal, it is determined that the to-be-detected face is a fake face.

Steps 904 to 906 may be processed in parallel with steps 907 to 919. In event that both the first eye movement state and the second eye movement state are normal, it is determined that the to-be-detected face is a real face, that is, in event that the first probability value is less than the first threshold, and the second probability value is less than the second threshold, it is determined that there is no abnormal blink behavior in the to-be-detected face, and it is further determined that the to-be-detected face is a real face.

In event that both the first probability value of the left eye and the first probability value of the right eye are less than the first threshold, and both the second probability value of the left eye and the second probability value of the right eye are less than the second threshold, it is determined that the to-be-detected face is a real face.

If both the first probability value P(L_SN) of the left eye and the first probability value P(R_SN) of the right eye are less than the first threshold, and both the second probability value P(L_SM) of the left eye and the second probability value P(R_SM) of the right eye are less than the second threshold, it is determined that the to-be-detected face is a real face.

In addition, when either of the first eye movement state and the second eye movement state is abnormal, it is determined that the to-be-detected face is a fake face.

After step 903 is performed, the eye movement probabilities in the eye movement state sequence are determined. If all the eye movement probabilities in the eye movement state sequence are less than an eye movement probability threshold, it is determined that the to-be-detected face is a fake face.

The eye movement probability threshold is a basis for determining whether there is a blink behavior according to the eye movement probabilities in the eye movement state sequence. The eye movement probability threshold is determined after the eye movement state acquisition model is trained.

If all the eye movement probabilities in the eye movement state sequence are less than the eye movement probability threshold, it is determined that there is no blink behavior in the face video data, and it is determined that the to-be-detected face is a fake face; otherwise, step 904 begins to be performed.

Figure 10:
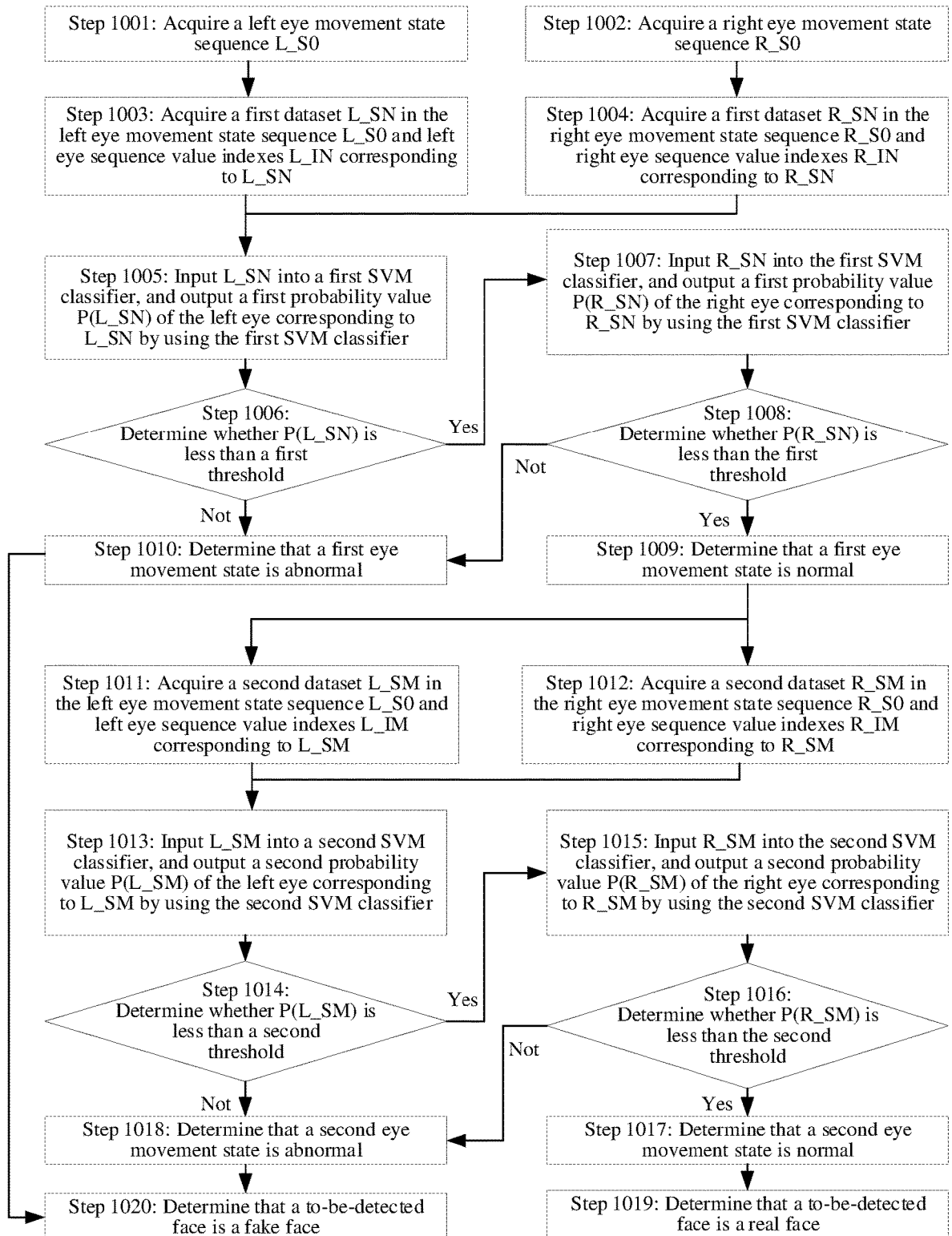
FIG. 10 is a schematic exemplary diagram of further analyzing real and fake faces based on an eye movement state sequence.

In an exemplary embodiment, FIG. 10 is a schematic diagram of further analyzing real and fake faces based on an eye movement state sequence, which includes the following steps (1001 to 1020).

Step 1001: Acquire a left eye movement state sequence L_S0.

Step 1002: Acquire a right eye movement state sequence R_S0.

Step 1001 and step 1002 may be performed at the same time, or may be performed successively. This is not limited in this embodiment of this application.

Step 1003: Acquire a first dataset L_SN in the left eye movement state sequence L_S0 and left eye sequence value indexes L_IN corresponding to L_SN.

The left eye movement state sequence L_S0 is arranged in descending order, first N pieces of data are acquired, to obtain a sequence L_SN, and sequence value indexes L_IN are generated.

Step 1004: Acquire a first dataset R_SN in the right eye movement state sequence R_S0 and right eye sequence value indexes R_IN corresponding to R_SN.

The right eye movement state sequence R_S0 is arranged in descending order, first N pieces of data are acquired, to obtain a sequence R_SN, and sequence value indexes R_IN are generated.

Step 1003 and step 1004 may be performed at the same time, or may be performed successively. This is not limited in this embodiment of this application.

Step 1005: Input L_SN into a first SVM classifier, and output a first probability value P(L_SN) of the left eye corresponding to L_SN by using the first SVM classifier.

Step 1006: Determine whether P(L_SN) is less than a first threshold; and if yes, perform step 1007; and if not, perform step 1010 and then perform step 1020.

Step 1007: Input R_SN into the first SVM classifier, and output a first probability value P(R_SN) of the right eye corresponding to R_SN by using the first SVM classifier.

Step 1005 and step 1007 may be performed at the same time, or may be performed successively. This is not limited in this embodiment of this application.

Step 1008: Determine whether P(R_SN) is less than the first threshold; and if yes, perform step 1009; and if not, perform step 1010 and then perform step 1020.

Step 1006 and step 1008 may be performed at the same time, or may be performed successively. This is not limited in this embodiment of this application.

Step 1009: Determine that a first eye movement state is normal.

Step 1010: Determine that a first eye movement state is abnormal.

Step 1011: Acquire a second dataset L_SM in the left eye movement state sequence L_S0 and left eye sequence value indexes L_IM corresponding to L_SM.

M pieces of data in the left eye movement state sequence L_S0 are acquired, to obtain a sequence L_SM, and sequence value indexes L_IM are generated.

Step 1012: Acquire a second dataset R_SM in the right eye movement state sequence R_S0 and right eye sequence value indexes R_IM corresponding to R_SM.

M pieces of data in the right eye movement state sequence R_S0 are acquired, to obtain a sequence R_SM, and sequence value indexes R_IM are generated.

Step 1011 and step 1012 may be performed at the same time, or may be performed successively. This is not limited in this embodiment of this application.

Step 1013: Input L_SM into a second SVM classifier, and output a second probability value P(L_SM) of the left eye corresponding to L_SM by using the second SVM classifier.

Step 1014: Determine whether P(L_SM) is less than a second threshold; and if yes, perform step 1015; and if not, perform step 1018 and then perform step 1020.

Step 1015: Input R_SM into the second SVM classifier, and output a second probability value P(R_SM) of the right eye corresponding to R_SM by using the second SVM classifier.

Step 1013 and step 1015 may be performed at the same time, or may be performed successively. This is not limited in this embodiment of this application.

Step 1016: Determine whether P(R_SM) is less than the second threshold; and if yes, perform step 1017; and if not, perform step 1018 and then perform step 1020.

Step 1014 and step 1016 may be performed at the same time, or may be performed successively. This is not limited in this embodiment of this application.

Step 1017: Determine that a second eye movement state is normal, and perform step 1019.

Step 1018: Determine that a second eye movement state is abnormal, and perform step 1020.

Step 1019: Determine that a to-be-detected face is a real face.

Step 1020: Determine that a to-be-detected face is a fake face.

Based on the above, according to this embodiment of this application, by determining first eye movement states and second eye movement states of the left eye and the right eye in sequence, once it is found that the first or second eye movement state in the left eye or right eye is abnormal, it can be timely determined that the to-be-detected face is a fake face, thereby improving the efficiency of face recognition, and reducing the amount of calculation of face recognition.

Apparatus embodiments of this application are described below, which can be configured to perform the method embodiments of this application. For details not disclosed in the apparatus embodiments of this application, reference may be made to the method embodiments of this application.

Figure 11:
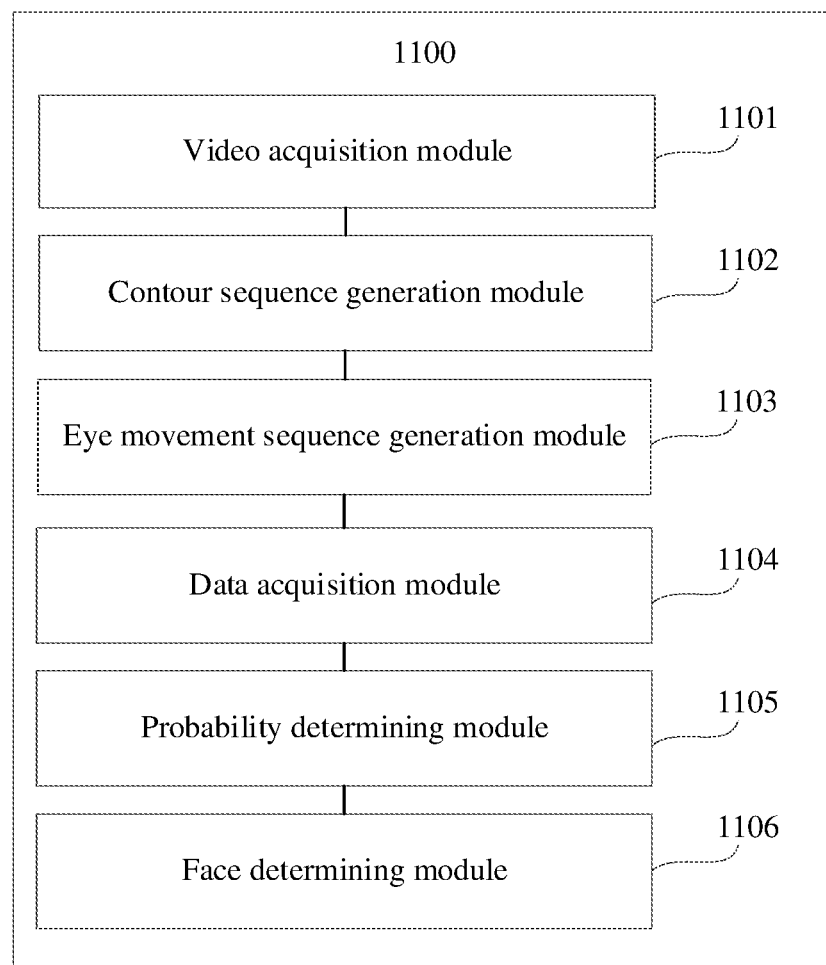
FIG. 11 is a block diagram of a face anti-spoofing recognition apparatus according to an embodiment of this application.

FIG. 11 is a face anti-spoofing recognition apparatus according to an embodiment of this application. The apparatus 1100 includes: a video acquisition module 1101, a contour sequence generation module 1102, an eye movement sequence generation module 1103, a data acquisition module 1104, a probability determining module 1105, and a face determining module 1106.

The video acquisition module 1101 is configured to acquire face video data including a to-be-detected face, the face video data being video data including the to-be-detected face.

The contour sequence generation module 1102 is configured to detect eye contours of the to-be-detected face from image frames of the face video data, and generate an eye contour sequence.

The eye movement sequence generation module 1103 is configured to perform eye movement probability prediction based on the eye contour sequence, and generate an eye movement state sequence, the eye movement state sequence being used for representing a movement condition of the eyes of the to-be-detected face, and the eye movement state sequence including a plurality of eye movement probabilities distributed in time domain.

The data acquisition module 1104 is configured to acquire a first dataset and a second dataset in the eye movement state sequence, the first dataset including first N eye movement probabilities obtained after arrangement of the eye movement probabilities in the eye movement state sequence in descending order, and the second dataset including M consecutive eye movement probabilities including a maximum value in the eye movement state sequence, both N and M being positive integers.

The probability determining module 1105 is configured to determine a probability of existence of an abnormal blink behavior of the to-be-detected face according to the first dataset and the second dataset.

The face determining module 1106 is configured to determine that the to-be-detected face is a real face in response to the probability being less than a predetermined threshold.

In an exemplary embodiment, the probability determining module 1105 is configured to: determine a first probability value according to the first dataset; and determine a second probability value according to the second dataset. The face determining module 1106 is configured to determine, in response to the first probability value being less than a first threshold and the second probability value being less than a second threshold, that the to-be-detected face is the real face.

In an exemplary embodiment, the eye movement state sequence includes an eye movement state sequence of the left eye and an eye movement state sequence of the right eye.

The probability determining module 1105 is configured to: determine a first probability value of the left eye according to a first dataset in the eye movement state sequence of the left eye; and determine a first probability value of the right eye according to a first dataset in the eye movement state sequence of the right eye; and determine a second probability value of the left eye according to a second dataset in the eye movement state sequence of the left eye; and determine a second probability value of the right eye according to a second dataset in the eye movement state sequence of the right eye.

The face determining module 1106 is configured to determine, in response to both the first probability value of the left eye and the first probability value of the right eye being less than the first threshold, and both the second probability value of the left eye and the second probability value of the right eye being less than the second threshold, that the to-be-detected face is the real face.

In an exemplary embodiment, the probability determining module 1105 is configured to:
process the first dataset by using a first classification model, to obtain the first probability value; and
process the second dataset by using a second classification model, to obtain the second probability value.

In an exemplary embodiment, the data acquisition module 1104 is configured to:
acquire the maximum value $V_j$ in the eye movement state sequence and a position index $I_j$ of the maximum value $V_j$ in the eye movement state sequence, a length of the eye movement state sequence being L;
determine a value of M according to a frame rate of the face video data, M being less than or equal to a total quantity of frames of the face video data; and
acquire, in response to a value of $I_j-M/2$ being greater than 0 and a value of $I_j+M/2$ being less than L−1, M consecutive eye movement probabilities with position indexes from $I_j-M/2$ to $I_j+M/2$ to obtain the second dataset; or
acquire, in response to a value of $I_j-M/2$ being less than 0, M consecutive eye movement probabilities with position indexes from 0 to M−1 to obtain the second dataset; or
acquire, in response to a value of $I_j+M/2$ being greater than L−1, M consecutive eye movement probabilities with position indexes from L−M to L−1 to obtain the second dataset.

In an exemplary embodiment, the contour sequence generation module 1102 is configured to:
decompose the face video data frame by frame to obtain a plurality of image frames;
recognize the to-be-detected face in the plurality of image frames, crop face regions of the to-be-detected face, and generate a face image sequence;
mark eye contour key points in face images of the face image sequence; and
crop eye contour images according to the eye contour key points in the face images, and generate the eye contour sequence.

In an exemplary embodiment, the eye movement sequence generation module 1103 is configured to:
perform feature extraction on the eye contour sequence, to obtain eye feature information;
compare the eye feature information in the time domain to obtain an eye movement change trend;
perform eye movement state prediction according to the eye movement change trend to obtain the eye movement probabilities; and generate the eye movement state sequence based on the eye movement probabilities.

Based on the above, according to the technical solution provided in this embodiment of this application, by parsing face video data to obtain eye movement probability sets that reflect an eye movement state of a to-be-detected face, that is, an eye movement state sequence, analyzing whether an abnormal blink behavior exists in the face video data according to two particular eye movement probability sets thereof, and then determining whether the to-be-detected face is a real face, the accuracy in recognition of highly realistic fake face videos is improved, thereby improving the security of face recognition, and effectively preventing lawbreakers from forging identities of others by using fake face videos.

The face anti-spoofing recognition apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the face anti-spoofing recognition apparatus and face anti-spoofing recognition method embodiments provided in the foregoing embodiments belong to the same conception. For the specific implementation process, reference may be made to the method embodiments, and details are not described herein again.

Figure 12:
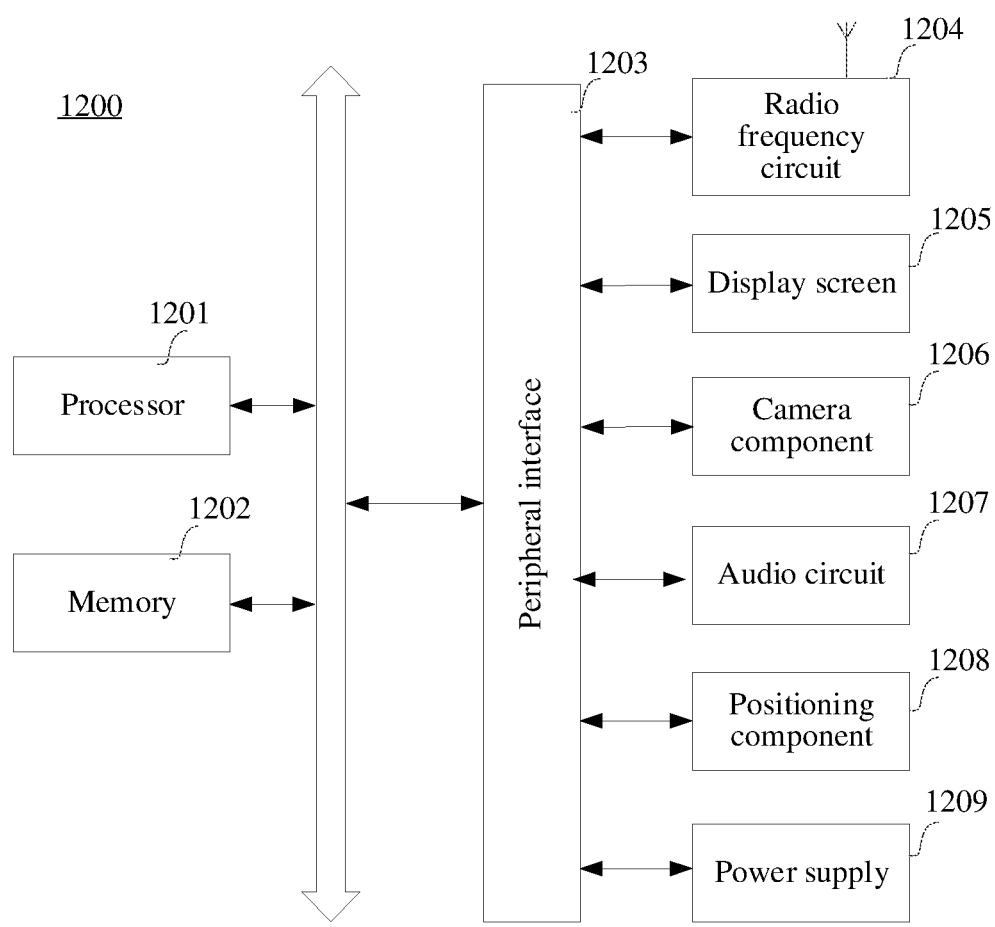
FIG. 12 is a structural block diagram of a computer device according to an embodiment of this application.

FIG. 12 is a structural block diagram of a computer device 1200 according to an exemplary embodiment of this application. The computer device 1200 may be the terminal 10 or the server 20 described above. The computer device 1200 is configured to perform the face anti-spoofing recognition method provided in the foregoing embodiments.

Generally, the computer device 1200 includes a processor 1201 and a memory 1202.

The processor 1201 may include one or more processing cores, for example, a 4-core processor or an 8-core processor. The processor 1201 may be implemented by using at least one hardware form of a digital signal processor (DSP), a field-programmable gate array (FPGA), and a programmable logic array (PLA). The processor 1201 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1201 may be integrated with a graphics processing unit (GPU). The GPU is configured to render and draw content that needs to be displayed on a display screen. In some embodiments, the processor 1201 may further include an AI processor. The AI processor is configured to process a computing operation related to machine learning.

The memory 1202 may include one or more computer-readable storage media. The computer-readable storage medium may be non-volatile. The memory 1202 may further include a high-speed random access memory, and a non-volatile memory such as one or more magnetic disk storage devices and a flash storage device. In some embodiments, a non-volatile computer-readable storage medium in the memory 1202 is configured to store at least one instruction, at least one program, a code set, or an instruction set, the at least one instruction, the at least one program, the code set, or the instruction set being configured to be executed by the processor 1201 to implement the face anti-spoofing recognition method provided in the method embodiments of this application.

In some embodiments, the computer device 1200 may further include a peripheral interface 1203 and at least one peripheral. The processor 1201, the memory 1202, and the peripheral interface 1203 may be connected by a bus or a signal cable. Each peripheral may be connected to the peripheral interface 1203 by using a bus, a signal cable, or a circuit board. Specifically, the peripheral includes: at least one of a radio frequency (RF) circuit 1204, a touch display screen 1205, a camera component 1206, an audio circuit 1207, a positioning component 1208, and a power supply 1209.

A person skilled in the art may understand that the structure shown in FIG. 12 does not constitute any limitation on the computer device 1200, and the computer device may include more or fewer components than those shown in the figure, or some components may be combined, or a different component deployment may be used.

An exemplary embodiment of this application further provides a computer-readable storage medium, storing at least one instruction, at least one program, a code set, or an instruction set, the at least one instruction, the at least one program, the code set, or the instruction set being loaded and executed by a processor to implement the face anti-spoofing recognition method provided in the foregoing method embodiments.

An exemplary embodiment of this application further provides a computer program product, the computer program product, when run on a computer, causing the computer to perform the face anti-spoofing recognition method provided in the foregoing method embodiments.

The sequence numbers of the foregoing embodiments of this application are merely for description purposes, and are not intended to indicate the preference among the embodiments.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A face anti-spoofing recognition method, performed by a computer device, the method comprising:
acquiring face video data comprising a to-be-detected face;
detecting eye contours of the to-be-detected face from image frames of the face video data, and generating an eye contour sequence;
performing eye movement probability prediction based on the eye contour sequence, and generating an eye movement state sequence, the eye movement state sequence used to represent a movement condition of the eyes of the to-be-detected face, and the eye movement state sequence comprising a plurality of eye movement probabilities distributed in a time domain;
acquiring a first dataset and a second dataset in the eye movement state sequence, the first dataset comprising first N eye movement probabilities obtained after arrangement of the eye movement probabilities in the eye movement state sequence in descending order, and the second dataset comprising M consecutive eye movement probabilities comprising a maximum value in the eye movement state sequence, both N and M being positive integers;

determining a probability of existence of an abnormal blink behavior of the to-be-detected face according to the first dataset and the second dataset; and determining that the to-be-detected face is a real face in response to the probability being less than a predetermined threshold.

2. The method according to claim 1, wherein the determining the probability of existence of the abnormal blink behavior of the to-be-detected face according to the first dataset and the second dataset comprises:

determining a first probability value according to the first dataset; and determining a second probability value according to the second dataset; and wherein the determining that the to-be-detected face is a real face in response to the probability being less than a predetermined threshold comprises:

determining, in response to the first probability value being less than a first threshold and the second probability value being less than a second threshold, that the to-be-detected face is the real face.

3. The method according to claim 2, wherein the eye movement state sequence comprises an eye movement state sequence of the left eye and an eye movement state sequence of the right eye;

wherein the determining the first probability value according to the first dataset comprises:

determining a first probability value of the left eye according to a first dataset in the eye movement state sequence of the left eye; and determining a first probability value of the right eye according to a first dataset in the eye movement state sequence of the right eye;

wherein the determining the second probability value according to the second dataset comprises:

determining a second probability value of the left eye according to a second dataset in the eye movement state sequence of the left eye; and determining a second probability value of the right eye according to a second dataset in the eye movement state sequence of the right eye; and wherein the determining, in response to the first probability value being less than the first threshold and the second probability value being less than the second threshold, that the to-be-detected face is the real face comprises:

determining, in response to both the first probability value of the left eye and the first probability value of the right eye being less than the first threshold, and both the second probability value of the left eye and the second probability value of the right eye being less than the second threshold, that the to-be-detected face is the real face.

4. The method according to claim 2, wherein the determining the first probability value according to the first dataset comprises:

processing the first dataset by using a first classification model, to obtain the first probability value; and the determining a second probability value according to the second dataset comprises:

processing the second dataset by using a second classification model, to obtain the second probability value.

5. The method according to claim 1, wherein the acquiring the second dataset in the eye movement state sequence comprises:

acquiring the maximum value $V_j$ in the eye movement state sequence and a position index $I_j$ of the maximum value $V_j$ in the eye movement state sequence, a length of the eye movement state sequence being L;

determining a value of M according to a frame rate of the face video data, M being less than or equal to a total quantity of frames of the face video data; and acquiring, in response to a value of $I_j-M/2$ being greater than 0 and a value of $I_j+M/2$ being less than L−1, M consecutive eye movement probabilities with position indexes from $I_j-M/2$ to $I_j+M/2$ to obtain the second dataset.

6. The method according to claim 1, wherein the acquiring a second dataset in the eye movement state sequence comprises:

acquiring the maximum value $V_j$ in the eye movement state sequence and a position index $I_j$ of the maximum value $V_j$ in the eye movement state sequence, a length of the eye movement state sequence being L;

determining a value of M according to a frame rate of the face video data, M being less than or equal to a total quantity of frames of the face video data; and acquiring, in response to a value of $I_j-M/2$ being less than 0, M consecutive eye movement probabilities with position indexes from 0 to M−1 to obtain the second dataset.

7. The method according to claim 1, wherein the acquiring the second dataset in the eye movement state sequence comprises:

acquiring the maximum value $V_j$ in the eye movement state sequence and a position index $I_j$ of the maximum value $V_j$ in the eye movement state sequence, a length of the eye movement state sequence being L;

determining a value of M according to a frame rate of the face video data, M being less than or equal to a total quantity of frames of the face video data; and acquiring, in response to a value of $I_j+M/2$ being greater than L−1, M consecutive eye movement probabilities with position indexes from L−M to L−1 to obtain the second dataset.

8. The method according to claim 1, wherein the detecting the eye contours of the to-be-detected face from image frames of the face video data, and the generating the eye contour sequence comprises:

decomposing the face video data frame by frame to obtain a plurality of image frames;

recognizing the to-be-detected face in the plurality of image frames, cropping face regions of the to-be-detected face, and generating a face image sequence;

marking eye contour key points in face images of the face image sequence; and cropping eye contour images according to the eye contour key points in the face images and generating the eye contour sequence.

9. The method according to claim 1, wherein the performing the eye movement probability prediction based on the eye contour sequence, and generating the eye movement state sequence comprises:

performing feature extraction on the eye contour sequence, to obtain eye feature information;

comparing the eye feature information in the time domain to obtain an eye movement change trend;

performing eye movement state prediction according to the eye movement change trend to obtain the eye movement probabilities; and generating the eye movement state sequence based on the eye movement probabilities.

10. A face anti-spoofing recognition apparatus, comprising:
- a memory storing a plurality of instructions;
- a processor configured to execute the plurality of instructions, and upon execution of the plurality of instructions, is configured to:
  - acquire face video data comprising a to-be-detected face;
  - detect eye contours of the to-be-detected face from image frames of the face video data, and generate an eye contour sequence;
  - perform eye movement probability prediction based on the eye contour sequence, and generate an eye movement state sequence, the eye movement state sequence used to represent movement condition of the eyes of the to-be-detected face, and the eye movement state sequence comprising a plurality of eye movement probabilities distributed in time domain;
  - acquire a first dataset and a second dataset in the eye movement state sequence, the first dataset comprising first N eye movement probabilities obtained after arrangement of the eye movement probabilities in the eye movement state sequence in descending order, and the second dataset comprising M consecutive eye movement probabilities comprising a maximum value in the eye movement state sequence, both N and M being positive integers;
  - determine a probability of existence of an abnormal blink behavior of the to-be-detected face according to the first dataset and the second dataset; and
  - determine that the to-be-detected face is a real face in response to the probability being less than a predetermined threshold.

11. The apparatus according to claim 10, wherein the processor, in order to determine the probability of existence of the abnormal blink behavior of the to-be-detected face according to the first dataset and the second dataset, is configured to execute the plurality of instructions to:
- determine a first probability value according to the first dataset; and determine a second probability value according to the second dataset; and
- determine, in response to the first probability value being less than a first threshold and the second probability value being less than a second threshold, that the to-be-detected face is the real face.

12. The apparatus according to claim 11, wherein the eye movement state sequence comprises an eye movement state sequence of the left eye and an eye movement state sequence of the right eye;
- the processor, in order to determine the first probability value according to the first data set, is configured to execute the plurality of instructions to:
  - determine a first probability value of the left eye according to a first dataset in the eye movement state sequence of the left eye; and determine a first probability value of the right eye according to a first dataset in the eye movement state sequence of the right eye; and
- the processor, in order to determine the second probability value according to the second dataset, is configured to execute the plurality of instructions to:
  - determine a second probability value of the left eye according to a second dataset in the eye movement state sequence of the left eye; and determine a second probability value of the right eye according to a second dataset in the eye movement state sequence of the right eye; and
- the processor, in order to determine, in response to the first probability value being less than the first threshold and the second probability value being less than the second threshold, that the to-be-detected face is the real face, is configured to execute the plurality of instructions to:
  - determine, in response to both the first probability value of the left eye and the first probability value of the right eye being less than the first threshold, and both the second probability value of the left eye and the second probability value of the right eye being less than the second threshold, that the to-be-detected face is the real face.

13. The apparatus according to claim 11, wherein in order to determine the first probability value according to the first dataset, the processor is configured to execute the plurality of instructions to:
- process the first dataset by using a first classification model, to obtain the first probability value; and
- process the second dataset by using a second classification model, to obtain the second probability value.

14. The apparatus according to claim 10, wherein in order to acquire the second data set in the eye movement state sequence, the processor is configured to execute the plurality of instructions to:
- acquire the maximum value $V_j$ in the eye movement state sequence and a position index $I_j$ of the maximum value $V_j$ in the eye movement state sequence, a length of the eye movement state sequence being L;
- determine a value of M according to a frame rate of the face video data, M being less than or equal to a total quantity of frames of the face video data; and
- acquire, in response to a value of $I_j-M/2$ being greater than 0 and a value of $I_j+M/2$ being less than L−1, M consecutive eye movement probabilities with position indexes from $I_j-M/2$ to $I_j+M/2$ to obtain the second dataset; or
- acquire, in response to a value of $I_j-M/2$ being less than 0, M consecutive eye movement probabilities with position indexes from 0 to M−1 to obtain the second dataset; or
- acquire, in response to a value of $I_j+M/2$ being greater than L−1, M consecutive eye movement probabilities with position indexes from L−M to L−1 to obtain the second dataset.

15. The apparatus according to claim 10, wherein: the contour sequence generation module is configured to:
- decompose the face video data frame by frame to obtain a plurality of image frames;
- recognize the to-be-detected face in the plurality of image frames, crop face regions of the to-be-detected face, and generate a face image sequence;
- mark eye contour key points in face images of the face image sequence; and
- crop eye contour images according to the eye contour key points in the face images and generate the eye contour sequence.

16. A non-transitory computer-readable storage medium storing a plurality of instructions executable by a processor, that when executed by the processor, cause the processor to:
- acquire face video data comprising a to-be-detected face;
- detect eye contours of the to-be-detected face from image frames of the face video data, and generate an eye contour sequence;

perform eye movement probability prediction based on the eye contour sequence, and generate an eye movement state sequence, the eye movement state sequence used to represent movement condition of the eyes of the to-be-detected face, and the eye movement state sequence comprising a plurality of eye movement probabilities distributed in time domain;

acquire a first dataset and a second dataset in the eye movement state sequence, the first dataset comprising first N eye movement probabilities obtained after arrangement of the eye movement probabilities in the eye movement state sequence in descending order, and the second dataset comprising M consecutive eye movement probabilities comprising a maximum value in the eye movement state sequence, both N and M being positive integers;

determine a probability of existence of an abnormal blink behavior of the to-be-detected face according to the first dataset and the second dataset; and determine that the to-be-detected face is a real face in response to the probability being less than a predetermined threshold.

17. The non-transitory computer-readable storage medium according to claim 16, wherein the plurality of instructions, in order to cause the processor to determine the probability of existence of the abnormal blink behavior of the to-be-detected face according to the first dataset and the second dataset, is configured to cause the processor to:

determine a first probability value according to the first dataset; and determine a second probability value according to the second dataset; and determine, in response to the first probability value being less than a first threshold and the second probability value being less than a second threshold, that the to-be-detected face is the real face.

18. The non-transitory computer-readable storage medium according to claim 16, wherein in order to cause the processor to acquire the second dataset in the eye movement state sequence, the plurality of instructions is configured to cause the processor to:

acquire the maximum value $V_j$ in the eye movement state sequence and a position index $I_j$ of the maximum value $V_j$ in the eye movement state sequence, a length of the eye movement state sequence being L;

determine a value of M according to a frame rate of the face video data, M being less than or equal to a total quantity of frames of the face video data; and acquire, in response to a value of $I_j-M/2$ being less than 0, M consecutive eye movement probabilities with position indexes from 0 to M−1 to obtain the second dataset.

19. The non-transitory computer-readable storage medium according to claim 16, wherein in order to cause the processor to acquire the second dataset in the eye movement state sequence, the plurality of instructions is configured to cause the processor to:

acquire the maximum value $V_j$ in the eye movement state sequence and a position index $I_j$ of the maximum value $V_j$ in the eye movement state sequence, a length of the eye movement state sequence being L;

determine a value of M according to a frame rate of the face video data, M being less than or equal to a total quantity of frames of the face video data; and acquire, in response to a value of $I_j+M/2$ being greater than L−1, M consecutive eye movement probabilities with position indexes from L−M to L−1 to obtain the second dataset.

20. The non-transitory computer-readable storage medium according to claim 16, wherein in order to cause the processor to perform the eye movement probability prediction based on the eye contour sequence, and generate the eye movement state sequence, the plurality of instructions is configured to cause the processor to:

perform feature extraction on the eye contour sequence, to obtain eye feature information;

compare the eye feature information in the time domain to obtain an eye movement change trend;

perform eye movement state prediction according to the eye movement change trend to obtain the eye movement probabilities; and generate the eye movement state sequence based on the eye movement probabilities.

\* \* \* \* \*